US007177342B2

(12) United States Patent
Chun et al.

(10) Patent No.: US 7,177,342 B2

(45) Date of Patent: Feb. 13, 2007

(54) APPARATUS AND METHOD FOR TRANSMISSION BEAM FORMING OF ANTENNA ARRAY IN A MOBILE COMMUNICATION SYSTEM

(75) Inventors: Byung-Jin Chun, Suwon-shi (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 661 days.

(21) Appl. No.: 10/370,473

(22) Filed: Feb. 24, 2003

(65) Prior Publication Data

US 2003/0161384 A1 Aug. 28, 2003

(30) Foreign Application Priority Data

Feb. 23, 2002 (KR) ..................... 10-2002-0009786

(51) Int. Cl.
*H04B 1/69* (2006.01)
*H01Q 21/00* (2006.01)

(52) U.S. Cl. ...................................... 375/130; 343/853

(58) Field of Classification Search ................ 375/130, 375/315; 343/853, 850; 455/561.2, 561; 342/372, 373

See application file for complete search history.

(56) References Cited

U.S. PATENT DOCUMENTS

| | | | | |
|---|---|---|---|---|
| 7,039,363 | B1 * | 5/2006 | Kasapi et al. ............ | 455/67.11 |
| 2002/0000948 | A1 * | 1/2002 | Chun et al. ................. | 343/853 |

* cited by examiner

*Primary Examiner*—Khai Tran
(74) *Attorney, Agent, or Firm*—Roylance, Abrams, Berdo & Goodman, L.L.P.

(57) ABSTRACT

An apparatus and method in which a base station transmitter transmits the common beam to all mobile stations in a base station via an antenna array having at least two antennas, and forms a traffic beam according to a position of each mobile station. The base station transmitter determines a weight vector of the traffic beam based on a position of each mobile station. The base station transmitter calculates a common beam weight vector for all angles in order to minimize a difference between a power of a signal received at the mobile station through the antenna array and a template function of the antenna arrayat all angels; calculates a traffic beam weight vector in order to minimize a reception power difference between a traffic beam to be transmitted to a position of the mobile station and the common beam, based on the calculated common beam weight vector; multiplies the calculated traffic beam weight vector by a signal to be output to the antenna array; and transmits the traffic beam to the mobile station.

14 Claims, 4 Drawing Sheets

FL BEAM PATTERN (PHASE)

APPARATUS AND METHOD FOR TRANSMISSION BEAM FORMING OF ANTENNA ARRAY IN A MOBILE COMMUNICATION SYSTEM

PRIORITY

This application claims priority under 35 U.S.C. § 119 to an application entitled "Apparatus and Method for Transmission Beam forming of Antenna Array in a Mobile Communication System" filed in the Korean Industrial Property Office on Feb. 23, 2002 and assigned Serial No. 2002-9786, the contents of which are incorporated herein by reference.

BACKGROUND OF THE INVENTION

1. Field of the Invention

The present invention relates generally to a antenna array apparatus and method, and in particular, to an apparatus and method for efficient transmission beam forming of a antenna array in a mobile communication system.

2. Description of the Related Art

In order to meet an increasing demand for code division multiple access (CDMA) mobile communication systems, active researches have been conducted on a antenna array that form beams using a plurality of base station antennas. Commercialization of the antenna array is currently being developed. Since the future mobile communication must provide various high-speed multimedia services, a forward beam forming technique for enabling high-speed data transmission is needed.

Generally, in a mobile communication system, an antenna or smart antenna technology for a base station refers to a technology for transmission beam forming in a direction of a desired mobile station, using a plurality of antenna elements. However, compared to a base station system using the conventional omni-directional antenna or sector antenna, the antenna array technology has a larger subscriber capacity per cell, wider service coverage, call quality improvement, and a reduced power consumption per power amplifier. Such a base station antenna array can be applied to both transmission and reception. Herein, a description of the base station antenna array will be made with reference to a method of transmission beam forming.

The conventional sector antenna transmits both common channel, i.e., pilot channel, synch channel and paging channel, signals and traffic channel signals in a single common beam. However, the antenna array system uses a common beam for the common channel signals, it forms a narrow traffic beam for the traffic channel signals, in order to obtain the above-stated effects.

IS-95 or CDMA2000, a mobile communication specification, uses coherent modulation such as binary phase shift keying (BPSK) or quadrature phase shift keying (QPSK), both commonly called "multiple phase shift keying (MPSK)," In case of MPSK, a phase difference or phase offset may occur between a common channel signal transmitted to a mobile station through a common beam and a traffic channel signal transmitted to the mobile station through a traffic beam. The phase difference has a detrimental affect on system performance. Therefore, it is necessary to minimize the phase difference to minimize a bit error rate (BER) in order to meet the requirement for a desired call quality.

Herein, a common beam, for transmitting common channel signals, e.g., pilot, synchronization and paging channels must be commonly transmitted to all mobile stations in a sector. Thus it must be wide enough to cover the whole region in a sector. On the contrary, each traffic beam has different look direction of arrival(DOA) and Beam Width (BW) depending on the channel environment of each mobile station.

As described above, in order to form a transmission beam in a direction of a mobile station, it is necessary to form a transmission beam after estimating the DOA and BW.

SUMMARY OF THE INVENTION

It is, therefore, an object of the present invention to provide an apparatus and method for optimizing a transmission beam forming based on the DOA and BW in a mobile communication system using an antenna array.

To achieve the above and other objects, the present invention provides a method for determining a phase of a traffic beam based on a position of each mobile station in a base station transmitter. The base station transmitter transmits the common beam to all mobile stations via an antenna array having at least two antennas, and forms a traffic beam based on a position of each mobile station. The method steps of comprises; calculating a common beam weight vector for all angles in order to minimize a difference between a power of a signal received at the mobile station via the antenna array and a template function of the antenna array; calculating a traffic beam weight vector in order to minimize a reception power difference between a traffic beam to be transmitted to a position of the mobile station and the common beam, based on the calculated common beam weight vector; multiplying the calculated traffic beam weight vector by a signal to be output to the antenna array, and transmitting the traffic beam to the mobile station.

To achieve the above and other objects, the present invention provides an apparatus for forming a traffic beam by determining a phase of the traffic beam based on a position of each mobile station in a base station transmitter. The base station transmitter forms a common beam, transmits the common beam to all mobile stations via an antenna array having at least two antennas, and forms a traffic beam based on a position of each base station. The apparatus comprises a weight vector generator adapted to prestore weight vectors for each of a plurality of traffic beams and a common beam. The weight vectors are calculated by a least squares solution based on a direction of arrival (DOA) and a beamwidth (BW) of the common beam and a DOA and a BW of the traffic beam based on a position of each mobile station, and selecting one of the weight vectors based on an estimated DOA and BW based on a current position of the mobile station; and a transmission beam former adapted to control a formation of a transmission beam for transmitting a transmission message, based on the weight vector provided from the weight vector generator.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
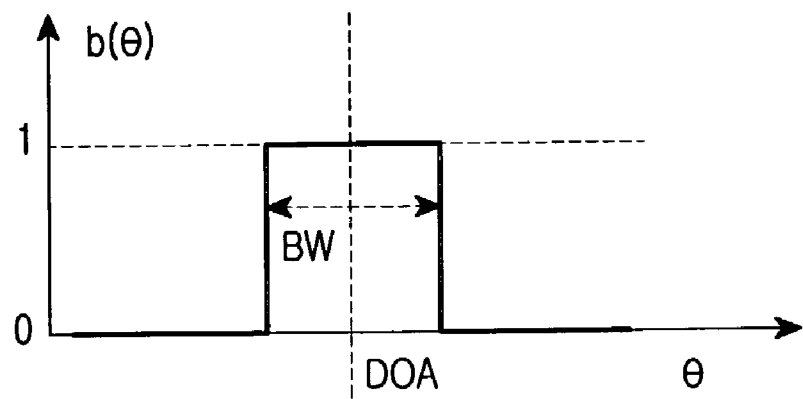
FIG. 1 is a diagram that illustrates an example of a template function according to an embodiment of the present invention.

Several embodiments of the present invention will now be described in detail with reference to the accompanying drawings. In the drawings, the same or similar elements are denoted by the same reference numerals. Also, a detailed description of known functions and configurations have been omitted for conciseness.

In the following description, the present invention provides a method for determining a direction of arrival (DOA) and a beamwidth (BW) of a transmission beam, and calculating a transmission weight vector which satisfies the determined DOA and BW. There are several methods of calculating the weight vector, and a description of the present invention will be made herein on the assumption that preferably a least squares solution is used as a weight vector calculation method. First, a description will be made of a basic principle of the least squares solution. Next, a description will be made of a method of synthesizing a common beam and a traffic beam using the least squares solution.

When a template function $b(\theta)$ reflecting a design specification and a weight vector is applied to a transmission antenna array, it is fundamental to determine a weight vector for signal power $|w^H a(\theta)|^2$ that a mobile station located at an angle $\theta$ on the basis of a reference direction of a base station will receive fits the template function. The template function $b(\theta)$ refers to a size of a signal in a desired direction. Here, $a(\theta)$ represents an array response vector (ARV) based on the form of an antenna array in use, and H represents a Hermitian operator. It will be appreciated by those skilled in the art that although the template of FIG. 1 was chosen as an example, other types of templates can be used without departing from the scope of the present invention. That is, it is preferable to determine a weight vectorw satisfying $|w^H a(\theta)|^2 \approx b(\theta)$ (where $-180° < \theta < 180°$).

Figure 2:
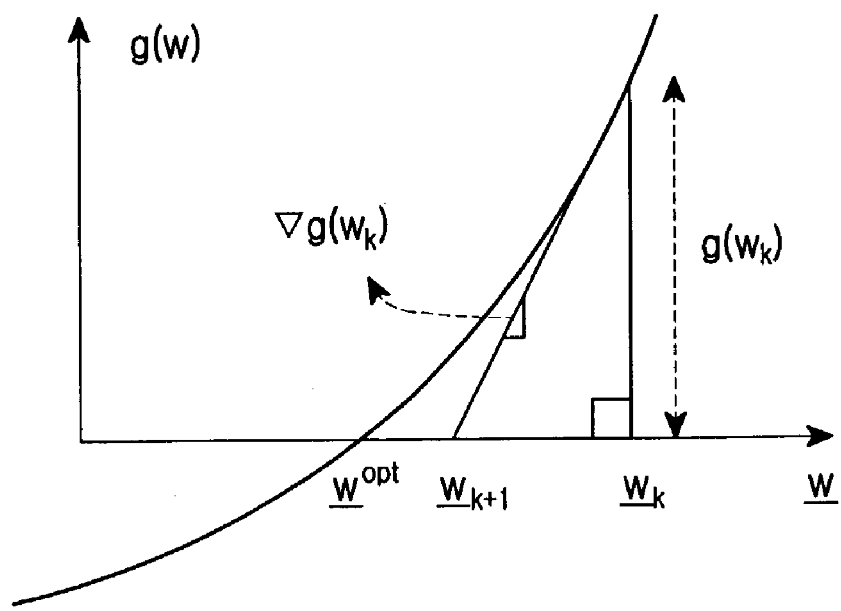
FIG. 2 is a graph that illustrates an example of a method of recursively determining a solution according to an embodiment of the present invention.

To this end, a definition of Equation (1) will be first given and then a description will be made of a method for recursively calculating a weight vector w with $g(w,\theta)=0$. FIG. 2 is a graph illustrating a method of recursively determining a solution.

$$g(w,\theta)=w^H a(\theta)a(\theta)^H w-b(\theta) \tag{1}$$

Referring to FIG. 2, if a current weight vector $w_k$ is given, a next weight vector $w_{k+1}$ can be geometrically calculated by $$\nabla g(w_k,\theta)^H w_{k+1}=\nabla g(w_k,\theta)^H w_k-g(w_k,\theta) \tag{2}$$

In Equation (2), $\nabla$ represents a gradient operation. If $\theta$ with a single value is given, a correct solution for the $w_{k+1}$ can be directly calculated. However, since the above relationship must be realized at a predetermined number N of angles $\theta=\theta_1, \ldots, \theta_N$, it is necessary to determine a weight vector $w_{k+1}$ satisfying Equation (3).

$$\nabla g(\underline{w}_k, \theta_1)^H \underline{w}_{k+1} = \nabla g(\underline{w}_k, \theta_1)^H \underline{w}_k - g(\underline{w}_k, \theta_1) \tag{3}$$

$$\vdots$$

-continued $$\nabla g(\underline{w}_k, \theta_N)^H \underline{w}_{k+1} = \nabla g(\underline{w}_k, \theta_N)^H \underline{w}_k - g(\underline{w}_k, \theta_N)$$

Equation (3) can be expressed in matrix form as Equation (4).

$$J\underline{w}_{k+1} = J\underline{w}_k - G \text{ where} \tag{4}$$

$$J = \begin{bmatrix} \nabla g(\underline{w}_k, \theta_1)^H \\ \vdots \\ \nabla g(\underline{w}_k, \theta_N)^H \end{bmatrix} = \begin{bmatrix} 2\underline{w}_k^H \underline{a}(\theta_1)\underline{a}(\theta_1)^H \\ \vdots \\ 2\underline{w}_k^H \underline{a}(\theta_N)\underline{a}(\theta_N)^H \end{bmatrix},$$

$$G = \begin{bmatrix} g(\underline{w}_k, \theta_1) \\ \vdots \\ g(\underline{w}_k, \theta_N) \end{bmatrix} = \begin{bmatrix} \underline{w}_k^H \underline{a}(\theta_1)\underline{a}(\theta_1)^H \underline{w}_k - b(\theta_1) \\ \vdots \\ \underline{w}_k^H \underline{a}(\theta_N)\underline{a}(\theta_N)^H \underline{w}_k - b(\theta_N) \end{bmatrix}$$

If N>dimension(w), there exists no $w_{k+1}$ accurately satisfying Equation (4). However, it is possible to calculate $w_{k+1}$ in accordance with Equation (5) using the least squares solution.

$$\begin{aligned} \underline{w}_{k+1} &= (J^H J)^{-1} J^H (J\underline{w}_k - G) \\ &= \underline{w}_k - (J^H J)^{-1} J^H G \end{aligned} \tag{5}$$

It is possible to calculate a converged weight vector by repeating the above process a predetermined number K of times. This calculation algorithm is defined as Initialize $w_1$ $$\text{For } k = 1, \ldots, K \tag{6}$$

$$\underline{w}_{k+1} = \underline{w}_k - (J^H J)^{-1} J^H G \text{ where}$$

$$J = \begin{bmatrix} 2\underline{w}_k^H \underline{a}(\theta_1)\underline{a}(\theta_1)^H \\ \vdots \\ 2\underline{w}_k^H \underline{a}(\theta_N)\underline{a}(\theta_N)^H \end{bmatrix},$$

$$G = \begin{bmatrix} \underline{w}_k^H \underline{a}(\theta_1)\underline{a}(\theta_1)^H \underline{w}_k - b(\theta_1) \\ \vdots \\ \underline{w}_k^H \underline{a}(\theta_N)\underline{a}(\theta_N)^H \underline{w}_k - b(\theta_N) \end{bmatrix}$$

end

A common beam or sector beam for transmitting common channel signals and a traffic beam or narrow beam for transmitting traffic channel signals are calculated by applying the fundamental transmission weight vector calculation method based on the least squares solution.

When a mobile communication system uses a modulation scheme of MPSK BPSK or QPSK in CDMA2000, a phase difference between a common channel signal received at a mobile station through the common beam and a traffic channel signal received at the mobile station through the traffic beam has a detrimental affect on system performance. That is, the phase difference must be minimized in order to minimize a bit error rate (BER) in order to obtain a desired call quality. To accomplish this, the following two conditions must be satisfied.

First, a common beam should satisfy a condition of BW=120 deg and DOA=0 deg so that the common beam should be irradiate all over one sector e.g., 120° in a 3-sector system, and a traffic beam should satisfy a condition of the minimum BW and DOA that are needed to check all scattering substances on a traffic channel, which affect a signal received at a mobile station. It will be assumed herein that these conditions are provided by other means.

If a weight vector of a common beam is defined as $w_1$, a weight vector of a traffic beam is defined as $w_q$, an array response vector of a transmission antenna array is defined as $a(\theta)$, a template function of a common beam is defined as $b_1(\theta)$, and a template function of a traffic beam is defined as $b_q(\theta)$, then $w_1$ and $w_q$ are determined so that a difference between actual power of a received signal and a template function should be minimized at all angles (herein, $-90° < \theta < 90°$). That is, weight vectors satisfying Equation (7) and Equation (8) are determined.

$$g_1(w_1,\theta) = w_1^H a(\theta) a(\theta)^H w_1 - b_1(\theta) \approx 0 \quad (7)$$

$$g_q(w_q,\theta) = w_q^H a(\theta) a(\theta)^H w_q - b_q(\theta) \approx 0 \quad (8)$$

Figure 3:
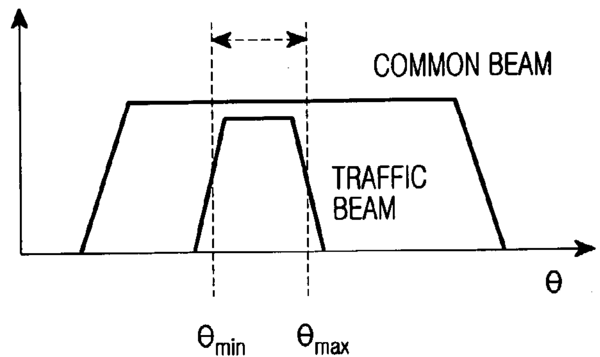
FIG. 3 is a graph that illustrates an example of an angle range where a sector beam or common beam overlaps with a narrow beam or traffic beam according to an embodiment of the present invention.

Second, $w_1$ and $w_q$ are determined so that a power difference between signals received at the mobile station through the common beam and the traffic beam within an angle range ($\theta_{q,min} < \theta < \theta_{q,max}$, see FIG. 3) where the two beams overlap with each other should be minimized. That is, a weight vector satisfying Equation (9) within an angle range of $\theta_{q,min} < \theta < \theta_{q,max}$ is determined.

$$\begin{aligned} h_q(\underline{w}_1, \underline{w}_q, \theta) &= \left| \underline{w}_q^H \underline{a}(\theta) - \underline{w}_1^H \underline{a}(\theta) \right|^2 \\ &= (\underline{w}_q - \underline{w}_1)^H \underline{a}(\theta) \underline{a}(\theta)^H (\underline{w}_q - \underline{w}_1) \approx 0 \end{aligned} \quad (9)$$

In Equation (9), ≈ indicates that both sides of the formula are approximate to each other.

Equation (7) to Equation (9) can be explained in view of the following two methods.

A first method is to first fix $w_1$ by determining a common beam in accordance with Equation (7) and then determine a traffic beam $w_q$ using Equation (8) and Equation (9). In the following description, this will be referred to as the "independent calculation method." According to the independent method, although the number of traffic beams to be solved is large, they can be independently solved, so the calculation does not become complicated.

A second method is to simultaneously solve Equation (7) to Equation (9). In the following description, this will be referred to as the "simultaneous calculation method." In the simultaneous calculation method, as the, number of traffic beams to be calculated becomes larger, the number of equations to be simultaneously solved also becomes larger, so the calculation becomes complicated.

The second method preferable to the first method due to its performance. However, it is difficult to simultaneously calculate a common beam and a traffic beam for all possible combinations of BW and DOA. Therefore, the present invention will be described in detail with reference to an embodiment corresponding to the first method, and the second method will be described in brief with reference to another embodiment.

The independent calculation method first calculates a $w_1$ that minimizes Equation (7) using an algorithm of Equation (6), and then recursively calculates a $w_q$ that minimizes both Equation (8) and Equation (9). Here, Equation (8) is preferably satisfied at all angles ($-90° < \theta < 90°$), whereas it is permitted that Equation (9) preferably satisfies within an angle range of $\theta_{q,min} < \theta < \theta_{q,max}$ where a sector beam overlaps with a corresponding traffic beam.

If a current weight vector $w_{q,k}$ is given in this way, a next weight vector $w_{q,k+1}$ can be calculated using Equation (10) and Equation (11).

$$\nabla_{w_q} g_q(w_{q,k},\theta)^H w_{q,k+1} = \nabla_{w_q} g(w_{q,k},\theta)^H w_{q,k} - g_q(w_{q,k},\theta) \quad (10)$$

$$\nabla_{w_q} h_q(w_1,w_{q,k},\theta)^H w_{q,k+1} = \nabla_{w_q} h_q(w_1,w_{q,k},\theta)^H w_{q,k} - h_q(w_1,w_{1,k},\theta) \quad (11)$$

In Equations (10) and (11), $\nabla w_q$ represents a gradient operation. Equation (10) is preferably satisfied for all angles of $\theta = \theta_1, \ldots, \theta_N$, and Equation (11) is preferably satisfied for all angles of $\theta = \theta_{q,min}, \ldots, \theta_{q,max}$. That is, Equation (10) and Equation (11) can be written as $$J_q w_{q,k+1} = J_q w_{q,k} - G_q$$

$$I_q w_{q,k+1} = I_q w_{q,k} - H_q \quad (12)$$

In Equation (12), $J_q$, $G_q$, $I_q$ and $H_q$ are defined as $$J_q = \begin{bmatrix} \nabla g_q(\underline{w}_{q,k}, \theta_1)^H \\ \vdots \\ \nabla g_q(\underline{w}_{q,k}, \theta_N)^H \end{bmatrix} = \begin{bmatrix} 2\underline{w}_{q,k}^H \underline{a}(\theta_1)\underline{a}(\theta_1)^H \\ \vdots \\ 2\underline{w}_{q,k}^H \underline{a}(\theta_N)\underline{a}(\theta_N)^H \end{bmatrix} \quad (13)$$

$$G_q = \begin{bmatrix} g_q(\underline{w}_{q,k}, \theta_1) \\ \vdots \\ g_q(\underline{w}_{q,k}, \theta_N) \end{bmatrix} = \begin{bmatrix} \underline{w}_{q,k}^H \underline{a}(\theta_1)\underline{a}(\theta_1)^H \underline{w}_{q,k} - b_q(\theta_1) \\ \vdots \\ \underline{w}_{q,k}^H \underline{a}(\theta_N)\underline{a}(\theta_N)^H \underline{w}_{q,k} - b_q(\theta_N) \end{bmatrix}$$

$$I_q = \begin{bmatrix} \nabla_{\underline{w}_q} h_q(\underline{w}_1, \underline{w}_{q,k}, \theta_{q,\min})^H \\ \vdots \\ \nabla_{\underline{w}_q} h_q(\underline{w}_1, \underline{w}_{q,k}, \theta_{q,\max})^H \end{bmatrix} = \begin{bmatrix} 2(\underline{w}_{q,k} - \underline{w}_1)^H \underline{a}(\theta_{q,\min})\underline{a}(\theta_{q,\min})^H \\ \vdots \\ 2(\underline{w}_{q,k} - \underline{w}_1)^H \underline{a}(\theta_{q,\max})\underline{a}(\theta_{q,\max})^H \end{bmatrix}$$

$$H_q = \begin{bmatrix} h_q(\underline{w}_1, \underline{w}_{q,k}, \theta_{q,\min}) \\ \vdots \\ h_q(\underline{w}_1, \underline{w}_{q,k}, \theta_{q,\max}) \end{bmatrix} = \begin{bmatrix} (\underline{w}_{q,k} - \underline{w}_1)^H \underline{a}(\theta_{q,\min})\underline{a}(\theta_{q,\min})^H (\underline{w}_{q,k} - \underline{w}_1) \\ \vdots \\ (\underline{w}_{q,k} - \underline{w}_1)^H \underline{a}(\theta_{q,\max})\underline{a}(\theta_{q,\max})^H (\underline{w}_{q,k} - \underline{w}_1) \end{bmatrix}$$

In addition, Equation (12) can be written as $$A\underline{w}_{q,k+1} = A\underline{w}_{q,k} - B \text{ where } A = \begin{bmatrix} J_q \\ I_q \end{bmatrix}, B = \begin{bmatrix} G_q \\ H_q \end{bmatrix} \quad (14)$$

There exists no $w_{q,k+1}$ which accurately satisfies Equation (14). Instead, the $w_{q,k+1}$ is calculated using the least squares solution in accordance with Equation (15).

$$w_{q,k+1} = w_{q,k} - (A^H A)^{-1} A^H B \quad (15)$$

Equation 15 is a solution for minimizing a cost function of $Z(w_{q,k+1}) = \|Aw_{q,k+1} - Aw_{q,k} + B\|^2 = \|J_q w_{q,k+1} - J_q w_{q,k} + G_q\|^2 + \|I_q w_{q,k+1} - I_q w_{q,k} + H_q\|^2$, and it is possible to obtain a converged weight vector by repeating the process of Equation (15) a predetermined number of times. When $w_{q,k+1}$ is converged, $w_{q,k+1} = w_{q,k}$. Therefore, the cost function value becomes a least squares error value of $LSE = \|G_q\|^2 + \|H_q\|^2$ that can be obtained by the above algorithm.

In Equation (15), it is possible to reflect a corresponding condition in the least squares solution by a predetermined value by applying a weight $\lambda_{J_q}$ or $\lambda_{I_q}$ on the least squares solution to each weight vector $w_{q,k+1}$. In this case, the least squares solution can be represented by $$\underline{w}_{q,k+1} = \underline{w}_{q,k} - (A^H \Lambda A)^{-1} A^H \Lambda B \quad (16)$$

$$\text{where } \Lambda = \begin{bmatrix} \lambda_{J_q} & 0 \\ 0 & \lambda_{I_q} \end{bmatrix}$$

Summarizing, the independent calculation algorithm can be represented by

Initialization $w_q = w_{q,1}$

For k=1,2, . . . ,k $$w_{q,k,+1} = w_{q,k} - (A^H \Lambda A)^{-1} A^H \Lambda B \quad (17)$$

$$\text{where } A = \begin{bmatrix} J_q \\ I_q \end{bmatrix}, B = \begin{bmatrix} G_q \\ H_q \end{bmatrix}, ? = \begin{bmatrix} \lambda_{J_q} & 0 \\ 0 & \lambda_{I_q} \end{bmatrix},$$

$$J_q = \begin{bmatrix} 2\underline{w}_{q,k}^H \underline{a}(\theta_1)\underline{a}(\theta_1)^H \\ \vdots \\ 2\underline{w}_{q,k}^H \underline{a}(\theta_N)\underline{a}(\theta_N)^H \end{bmatrix}$$

$$G_q = \begin{bmatrix} \underline{w}_{q,k}^H \underline{a}(\theta_1)\underline{a}(\theta_1)^H \underline{w}_{q,k} - b_q(\theta_1) \\ \vdots \\ \underline{w}_{q,k}^H \underline{a}(\theta_N)\underline{a}(\theta_N)^H \underline{w}_{q,k} - b_q(\theta_N) \end{bmatrix}$$

$$I_q = \begin{bmatrix} 2(\underline{w}_{q,k} - \underline{w}_1)^H \underline{a}(\theta_{q,1})\underline{a}(\theta_{q,1})^H \\ \vdots \\ 2(\underline{w}_{q,k} - \underline{w}_1)^H \underline{a}(\theta_{q,M(q)})\underline{a}(\theta_{q,M(q)})^H \end{bmatrix}$$

$$H_q = \begin{bmatrix} (\underline{w}_{q,k} - \underline{w}_1)^H \underline{a}(\theta_{q,1})\underline{a}(\theta_{q,1})^H (\underline{w}_{q,k} - \underline{w}_1) \\ \vdots \\ (\underline{w}_{q,k} - \underline{w}_1)^H \underline{a}(\theta_{q,M(q)})\underline{a}(\theta_{q,M(q)})^H (\underline{w}_{q,k} - \underline{w}_1) \end{bmatrix}$$

end

Figure 4:
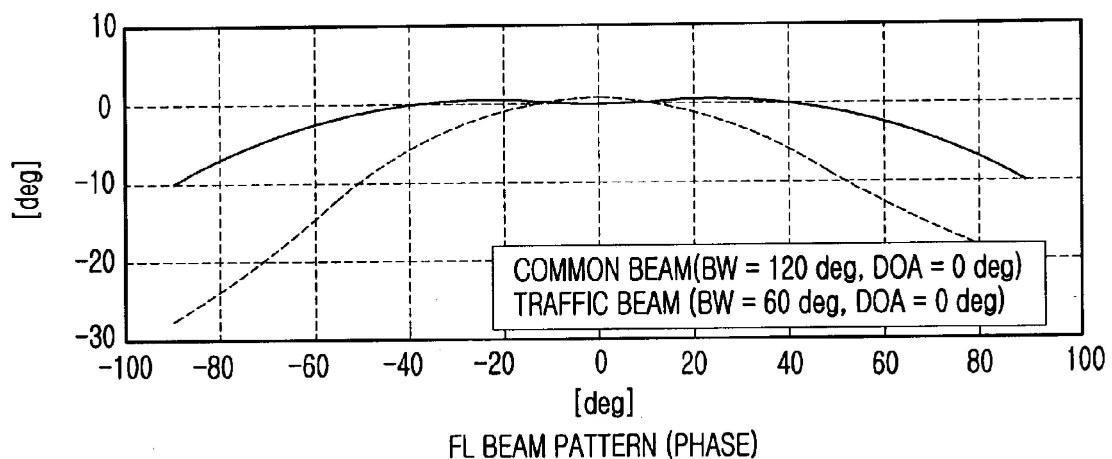
FIG. 4 depicts two graphs that illustrate an example of beam patterns of a forward link in terms of a magnitude and a phase according to an embodiment of the present invention.
Figure 4:
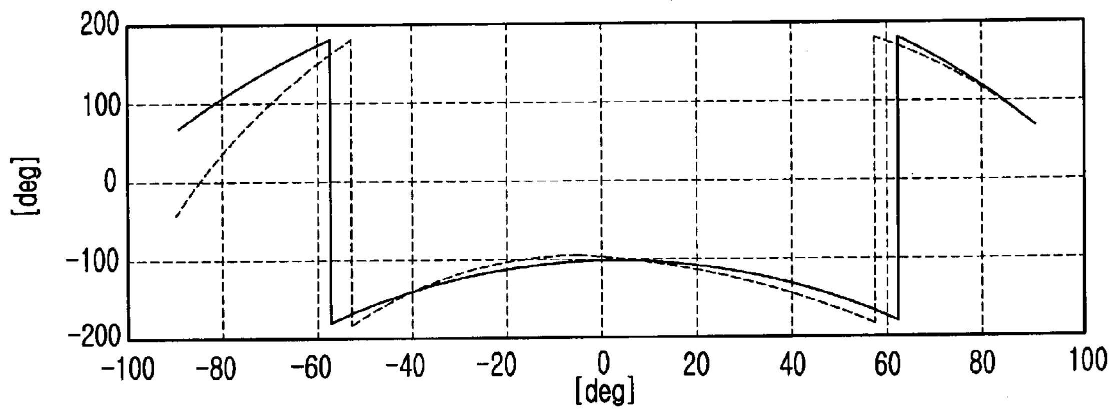

FIG. 4 depicts two graphs that illustrate an example of beam patterns of a forward link in terms of magnitude and a phase according to an embodiment of the present invention. Specifically, FIG. 4 illustrates a common beam having BW=120 deg and DOA=0 deg and a traffic beam having BW=60 deg and DOA=0 deg, obtained by synthesizing a circular antenna array with 4 antenna elements using a proposed algorithm. As illustrated, magnitude and phase characteristics of the synthesized beam not only satisfy a given requirement of BW and DOA, but also minimize a difference within an angle range where the common beam overlaps with the traffic beam.

Meanwhile, the simultaneous calculation method optimizes a transmission beam by simultaneously adjusting weight vectors, when the number of beams including common beams and traffic beams is Q.

For example, when forming Q beams, if it is assumed that a weight vector of each beam to be formed is $w_q$,(q=1, . . . ,Q), each beam's template function that must be satisfied is $b_q(\theta)$,(q=1, . . . ,Q).A difference between transmission signal power of each beam and a template function is $g_q(w_q,\theta)$, (q=1, . . . ,Q).A transmission signal power difference between each beam and a sector beam is $h_q(w_q,\theta)$,(q=1, . . . ,Q) The difference between a transmission signal power and a template function and the transmission signal power difference between each beam and a sector beam are represented by $$g_1(\underline{w}_1, \theta) = \underline{w}_1^H \underline{a}(\theta)\underline{a}(\theta)^H \underline{w}_1 - b_1(\theta) \quad (18)$$

$$\vdots$$

$$g_Q(\underline{w}_Q, \theta) = \underline{w}_Q^H \underline{a}(\theta)\underline{a}(\theta)^H \underline{w}_Q - b_Q(\theta)$$

The proposed method recursively simultaneously calculates $\{w_1, q=1, \ldots, Q\}$ with $g_q(w_q,\theta)=0$ and $h_q(w_q,\theta)=0$, and it is possible to obtain a simultaneous calculation algorithm with a method similar to the independent calculation method.

A detailed description will now be made of a preferred embodiment of the present invention with reference to the accompanying drawings.

Figure 5:
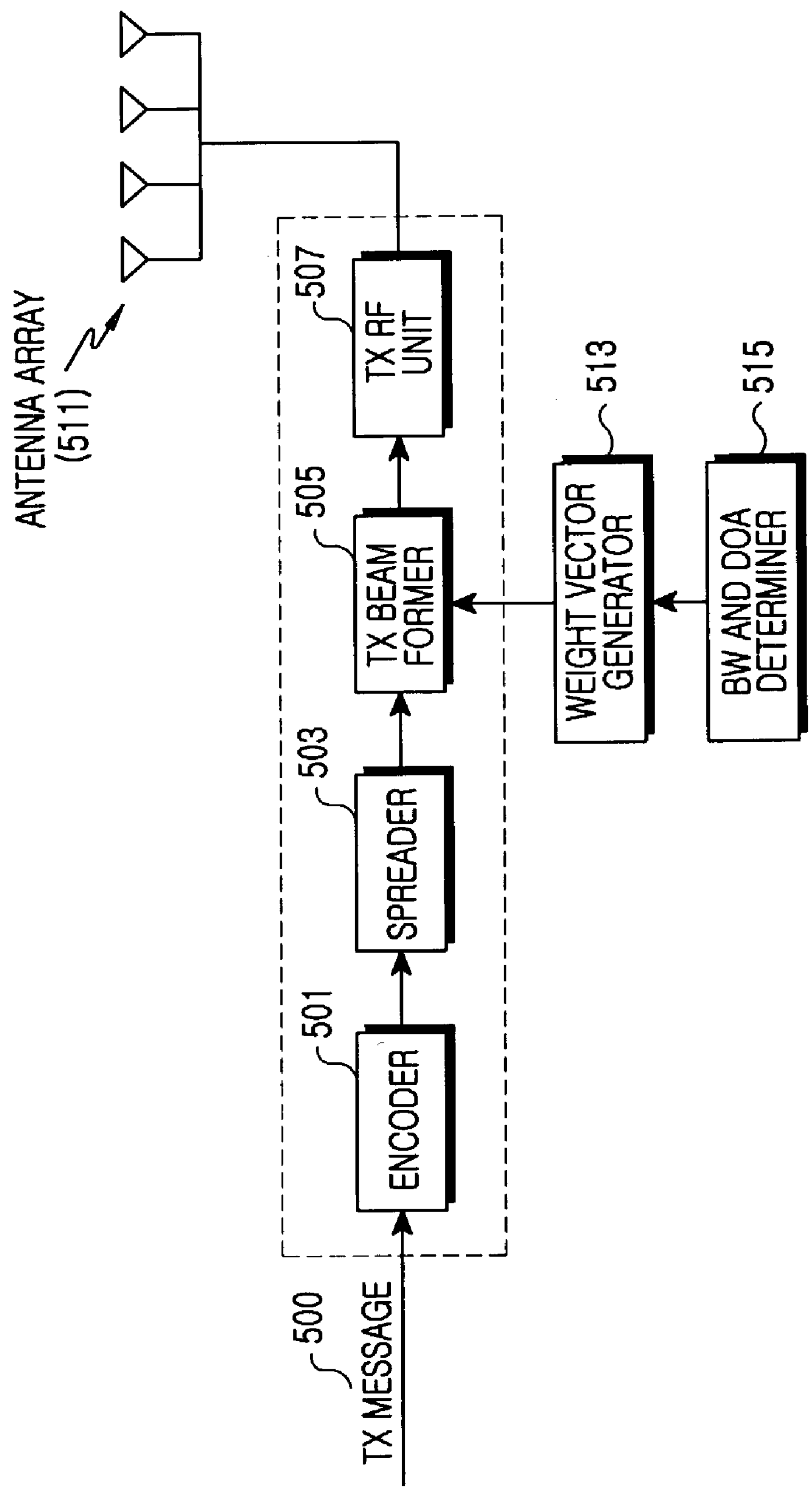
FIG. 5 is a block diagram that illustrates an example of a structure of a base station transmitter with an antenna array according to an embodiment of the present invention.

FIG. 5 is a block diagram that illustrates an example of a structure of a base station transmitter with an antenna array according to an embodiment of the resent invention. As illustrated, the base station transmitter includes an encoder 501, a spreader 503, a transmission beam former 505, a transmission radio frequency (RF) unit 507, an antenna array 511 having preferably N same antenna elements, a weight vector generator 513, and a BW and DOA determiner 515.

Referring to FIG. 5, the encoder 501 encodes a transmission message 500. A convolutional encoder or a turbo encoder is preferably used for the encoder 501. The spreader 503 spreads an output of the encoder 501. Here, spreading by the spreader 503 includes both orthogonal spreading for channel identification and pseudo noise (PN) spreading for base station identification. The transmission beam former 505 copies an output of the spreader 503 into a plurality of signals corresponding to the antenna elements in order to efficiently communicate with a mobile station that receives the transmission message, and multiplies the plurality of signals by weight vectors to be applied to forward multiple paths, provided from the weight vector generator 513. The transmission RF unit 507 converts outputs of the transmission beam former 505 into an RF signal. Outputs of the transmission RF unit 507 are formed into a beam via the antenna array 511 and then transmitted to the mobile station.

The BW and DOA determiner 515 determines the DOA and BW to be applied to a transmission beam, and considers a position and a radio channel condition of each mobile station. That is, the BW and DOA determiner 515 can estimate the DOA and BW by analyzing a signal received at the base station. The weight vector generator 513 previously stores (possesses) all possible weight vectors for the DOA and BW, which are calculated by an algorithm of FIG. 6, and provides a weight vector corresponding to the DOA and BW determined by the BW and DOA determiner 515, to the transmission beam former 505. As described above, a weight vector satisfying the DOA and BW is determined by the least squares solution.

Figure 6:
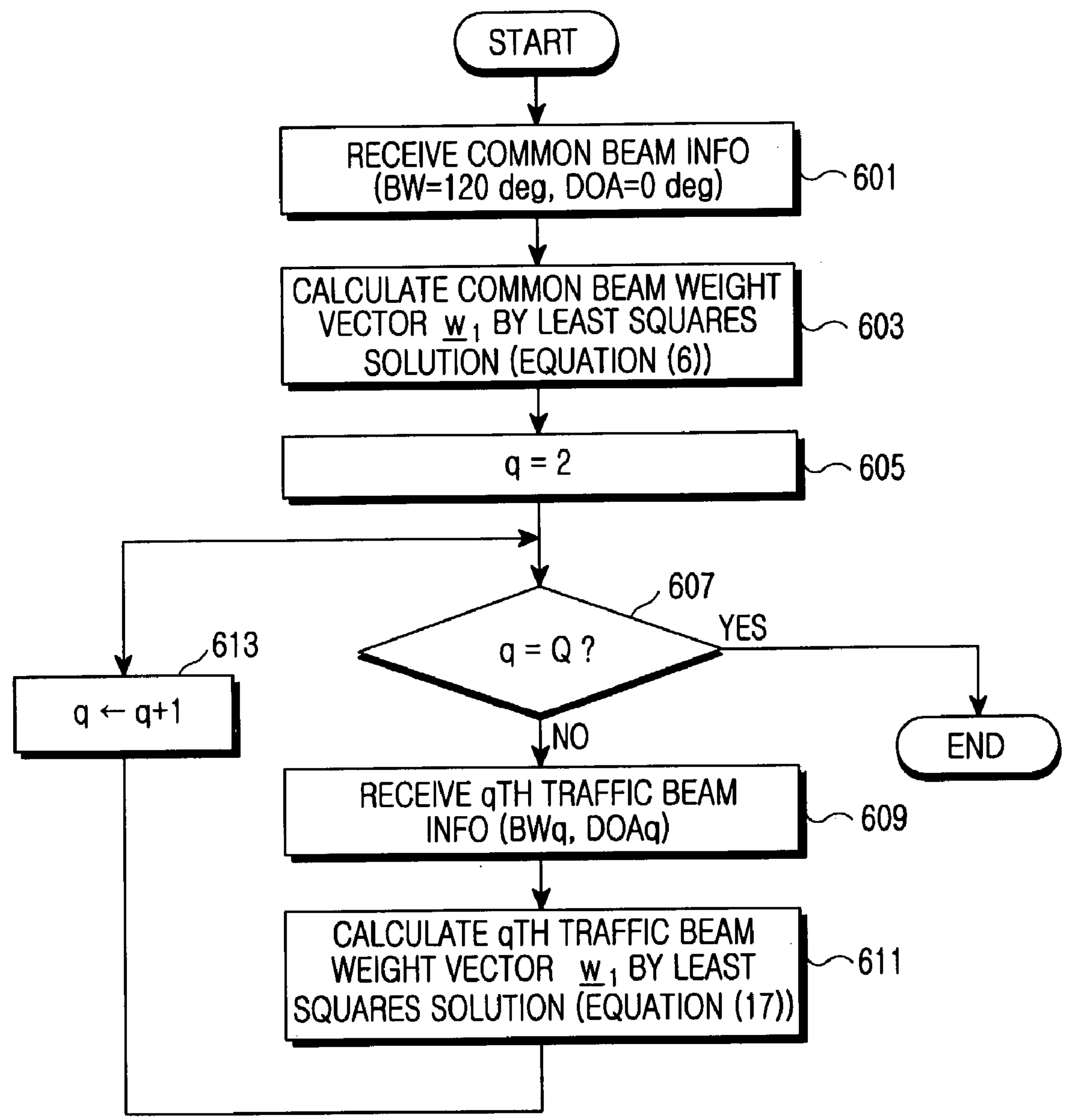
FIG. 6 is a flow chart that illustrates an example of operations for determining a weight vector for satisfying a predetermined DOA and BW via a least squares solution method according to an embodiment of the present invention.

FIG. 6 is a flow chart that illustrates an example of operations for determining a weight vector satisfying a predetermined DOA and BW by a least squares solution according to an embodiment of the present invention. It will be assumed herein that the independent calculation method and a 3-sector system are preferable used. It will also be assumed that an operation of FIG. 6 is performed by the weight vector generator 513. Although a weight vector for the determined DOA and BW can be read from a table that previously stores weight vectors as described in conjunction with FIG. 5, it is also possible to store a program for determining the weight vector and calculate a weight vector each time BW and DOA are determined in accordance with an embodiment of the present invention.

Referring to FIG. 6, the weight vector generator 513 determines common beam information including BW and DOA in step 601. The term "common beam" refers to a beam for transmitting a common channel signal. Since it is assumed that a 3-sector system is used, BW of the common beam becomes 120 deg and DOA of the common beam becomes 0 deg. Thereafter, the weight vector generator 513 calculates in step 603 a weight vector $w_1$ of the common beam based on the common beam information by the least squares solution (Equation (6)). Here, the least squares solution is a method for minimizing an average square value determined by adding, for all angles, a square of a difference between the power of a transmission signal at each angle and a template function in which the DOA and BW of the common beam are reflected.

After determining a weight vector of the common beam, the weight vector generator 513 sets a parameter q to 2 in step 605. The weight vector generator 513 determines in step 607 whether a value of the parameter q has arrived at a prescribed value Q, where Q represents the number of traffic beams for which weight vectors are calculated. When a value of the parameter q has arrived at the value Q, the weight vector generator 513 ends the procedure. Otherwise, the weight vector generator 513 proceeds to step 609.

In step 609, the weight vector generator 513 determines information BW and DOA on a $q^{th}$ traffic beam. The traffic beam, a beam for transmitting traffic, is determined by a position and a radio channel condition of a mobile station. After determining information on the $q^{th}$ traffic beam, the weight vector generator 513 calculates in step 611 a weight vector $w_1$ of a traffic beam based on the traffic beam information and the determined weight vector of the common beam by the least squares solution (Equation (17)). Here, the least squares solution is a method for minimizing an average square value determined by adding, for all angles, a square of a difference between a transmission signal of a common beam and a transmission signal of a traffic beam within an angle range where the common beam overlaps the traffic beam.

Thereafter, the weight vector generator 513 increases in step 613 a value of the parameter q by '1' and then returns to step 607. In the meantime, if a value of the parameter q arrives at the value Q, the weight vector generator 513 can generate weight vectors corresponding to the Q beams including the common beams and the traffic beams.

As described above, the present invention can optimize a transmission beam satisfying DOA and BW when the DOA and BW are determined. That is, the present invention can achieve a high-performance forward transmission, and further contribute to an improvement in capacity and call quality of a mobile communication system and provide a reduction in the transmission power requirement of a mobile station.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for determining a weight vector of a traffic beam based on a position of each mobile station in a base station transmitter, said base station transmitter transmits a common beam to all mobile stations in a base station via an antenna array having at least two antennas, and transmits a traffic beam based on a position of each mobile station, the method comprising the steps of:

calculating a common beam weight vector to minimize a difference between a power of a signal received at the mobile station via the antenna array and a template function of the antenna array;

calculating a traffic beam weight vector in order to minimize a reception power difference between a traffic beam to be transmitted to a position of the mobile station and the common beam, based on the calculated common beam weight vector; and multiplying the calculated traffic beam weight vector by a signal to be output to the antenna array.

2. The method of claim 1, further comprising transmitting a traffic beam in which the calculated traffic beam weight vector is reflected.

3. The method of claim 1, wherein the common beam weight vector $w_1$ is calculated using a first equation $$g_1(w_1,\theta)=w_1^H a(\theta)a(\theta)^H w_1-b_1(\theta)\approx 0$$

where $w_1$ represents a weight vector of a common beam, $a(\theta)$ represents an array response vector of an antenna array, $b_1(\theta)$ represents a template function of a common beam, and H represents a Hermitian operator.

4. The method of claim 1, wherein the traffic beam weight vector $w_q$ is calculated using a second equation $$g_q(w_q,\theta)=w_q^H a(\theta)a(\theta)^H w_q-b_q(\theta)\approx 0$$

and a third equation $$\begin{aligned} h_q(\underline{w}_1, \underline{w}_q, \theta) &= \left|\underline{w}_q^H a(\theta) - \underline{w}_1^H \underline{a}(\theta)\right|^2 \\ &= \left(\underline{w}_q - \underline{w}_1\right)^H \underline{a}(\theta)\underline{a}(\theta)^H \left(\underline{w}_q - \underline{w}_1\right) \approx 0 \end{aligned}$$

where $w_q$ represents a weight vector of a traffic beam, $w_1$ represents a weight vector of a common beam, $a(\theta)$ represents an array response vector of an antenna array, $b_1(\theta)$ represents a template function of a common beam, $b_q(\theta)$ represents a template function of a traffic beam, ≈ indicates that both sides of the formula are approximate to each other, and H represents a Hermitian operator.

5. The method of claim 4, wherein a value satisfying the second and third equations is calculated using a least squares solution.

6. An apparatus for forming a traffic beam by determining a weight vector of the traffic beam based on a position of each mobile station in a base station transmitter, said base station transmitter transmits a common beam to all mobile stations in a base station via an antenna array having at least two antennas, and forms a traffic beam based on a position of each mobile station, the apparatus comprising:

a weight vector generator for prestoring weight vectors for each of a plurality of traffic beams and a common beam, said weight vectors being calculated using a least squares solution based on a direction of arrival (DOA) and a beamwidth (BW) of the common beam, and a DOA and a BW of the traffic beam based on a position of each mobile station, and selecting one of the weight vectors based on an estimated DOA and BW based on a current position of the mobile station; and a transmission beam former for controlling a formation of a transmission beam in order to transmit transmission signals, based on the weight vector provided from the weight vector generator.

7. The apparatus of claim 6, wherein the transmission beam former further comprises copying the transmission signal into as many signals as a number N of antennas, and multiply each of the copied signals by the weight vector thereby generating N signals.

8. The apparatus of claim 6, wherein the least squares solution comprises a method for calculating a weight vector in order to minimize an average square value determined by adding, for all angles a square of a difference between a power of a transmission signal at each angle and a template function in which corresponding DOA and BW are reflected, within a prescribed angle range.

9. The apparatus of claim 6, wherein a weight vector of the common beam comprises a weight vector adapted to minimize an average square value determined by adding, for all angles, a square of a difference between a power of a transmission signal at each angle and a template function in which the DOA and the BW of the common beam are reflected, within an angle range of the common beam.

10. The apparatus of claim 9, wherein a weight vector of the traffic beam comprises a weight vector adapted to minimize an average square value determined by adding, for all angles, a square of a difference between the power of the transmission signal at each angle and the template function of the traffic beam within an angle range of the traffic beam, and to minimize an average square value determined by adding, for all angles a square of a difference between a transmission signal of the common beam and a transmission signal of the traffic beam, within an angle range, where the common beam overlaps with the traffic beam.

11. A method for forming a traffic beam by determining a weight vector of the traffic beam based on a position of each mobile station in a base station transmitter, said base station transmitter transmits the common beam to all mobile stations in a base station via an antenna array having at least two antennas, and forms a traffic beam based on a position of each mobile station, the method comprising the steps of:

prestoring weight vectors for each of a plurality of traffic beams and a common beam, said weight vectors being calculated using a least squares solution based on a direction of arrival (DOA) and a beamwidth (BW) of the common beam and DOA and BW of the traffic beam based on a position of each mobile station;

estimating a DOA and a BW based on a current position of the mobile station;

selecting one of the prestored weight vectors based on the estimated DOA and BW; and forming a transmission beam by multiplying the selected weight vector by a transmission signal.

12. The method of claim 11, wherein the least squares solution comprises a method for calculating a weight vector in order to minimize an average square value determined by adding, for all angles a square of a difference between power of a transmission signal at each angle and a template function in which corresponding DOA and BW are reflected, within a prescribed angle range.

13. The method of claim 11, wherein a weight vector of the common beam comprises a weight vector adapted to minimize an average square value determined by adding, for all angles, a square of a difference between a power of a transmission signal at each angle and a template function in which the DOA and the BW of the common beam are reflected, within an angle range of the common beam.

14. The method of claim 13, wherein a weight vector of the traffic beam comprises a weight vector adapted to minimize an average square value determined by adding, for all angles, a square of a difference between the power of the transmission signal at each angle and a template function of the traffic beam within an angle range of the traffic beam, and to minimize an average square value determined by adding, for all angles, a square of a difference between a transmission signal of the common beam and a transmission signal of the traffic beam, within an angle range, where the common beam overlaps with the traffic beam.

* * * * *